(12) United States Patent
Hudson et al.

(10) Patent No.: US 10,118,299 B1
(45) Date of Patent: Nov. 6, 2018

(54) ROD PULLER

(71) Applicant: Yak Mat, LLC., Columbia, MS (US)

(72) Inventors: Sam Hudson, Hattiesburg, MS (US); Deway Greene, Jr., Sumrall, MS (US); Brian M. Greenhoe, Hattiesburg, MS (US)

(73) Assignee: Yak Mat, LLC., Columbia, MS (US)

( * ) Notice: Subject to any disclaimer, the term of this patent is extended or adjusted under 35 U.S.C. 154(b) by 0 days.

(21) Appl. No.: 15/904,091

(22) Filed: Feb. 23, 2018

(51) Int. Cl.
*B25J 15/00* (2006.01)
*B25J 15/02* (2006.01)
*E01C 9/08* (2006.01)

(52) U.S. Cl.
CPC ....... *B25J 15/0028* (2013.01); *B25J 15/0206* (2013.01); *E01C 9/086* (2013.01)

(58) Field of Classification Search
CPC .......................... B25J 15/0028; B25J 15/0206
USPC ........... 294/203, 24, 26, 210, 198, 192, 194, 294/102.2
See application file for complete search history.

(56) References Cited

U.S. PATENT DOCUMENTS

| | | | |
|---|---|---|---|
| 3,453,774 A * | 7/1969 | Gruber | A63H 33/00 124/27 |
| 3,964,778 A | 6/1976 | Jouppi | |
| 3,978,576 A | 9/1976 | Mustoe | |
| 4,569,550 A * | 2/1986 | Harigane | H05K 13/0404 29/741 |
| 4,579,380 A | 4/1986 | Zaremsky | |
| 4,784,422 A * | 11/1988 | Jones | B25J 15/0028 294/106 |
| 5,762,390 A | 6/1998 | Gosselin | |
| 5,957,177 A | 9/1999 | Smith | |
| 6,170,895 B1 * | 1/2001 | Schopp | B25J 15/0206 294/116 |
| 6,412,845 B1 * | 7/2002 | Sawdon | B25B 5/122 294/198 |
| 6,530,578 B1 * | 3/2003 | Svensson | B23B 31/18 279/106 |
| 6,564,835 B1 | 5/2003 | Chai | |
| 7,540,545 B1 * | 6/2009 | Fetch | B60D 1/00 294/106 |
| 7,850,218 B2 * | 12/2010 | Delescluse | C25C 3/10 294/106 |

(Continued)

FOREIGN PATENT DOCUMENTS

EP 2106691 A1 10/2009

*Primary Examiner* — Paul T Chin
(74) *Attorney, Agent, or Firm* — Fish & Richardson P.C.

(57) ABSTRACT

An apparatus, system and method are described for removing rods from wood mats, the apparatus configured to assume an open position and a closed position. The apparatus has machine body, an attachment at the rear end of the machine body configured to attach a hydraulic cylinder, a rod that is slidably positioned within the machine body a spring within the machine body, the spring compressable by the rod, levers rotatably attached to the body, each lever having an extension arranged to penetrate a hole on the machine body and to fit within a rod depression on the rod therethrough, jaws protruding from the machine body, each jaw having a curved shape and a pointed end, each jaw rotatably movable; and a jaw ring positioned within the machine body contacts the jaws, wherein the apparatus assumes the closed position to bring the pointed ends of the jaws together radially.

15 Claims, 7 Drawing Sheets

(56) References Cited

U.S. PATENT DOCUMENTS

| | | |
|---|---|---|
| 8,011,708 B2 | 9/2011 | Becker |
| 8,382,177 B2 | 2/2013 | Rizk |
| 2008/0196790 A1 | 8/2008 | Fargeot |

* cited by examiner

ROD PULLER

TECHNICAL FIELD

This disclosure relates to extracting rods from assembled wood mats.

BACKGROUND

Timber mats are commonly used for temporary or portable road ways, bridge decking, excavation support, crane pads and pipeline construction. Timber mats usually are made of planks, which can be oak, mixed hardwoods, Douglas fir, or man-made materials. The timber mats must withstand large forces such as the weight of heavy trucks and machinery positioned or moving on top of them, and so must be supportive and secure. To attach the planks securely together, metal rods or bolts are generally driven through the planks.

SUMMARY

This disclosure describes a machine, system, and method for extracting metal rods from an assembled timber mat. Once assembled, the thick metal rods that hold together the planks of a timber mat are difficult to remove, as each plank must be individually slid along and removed from the rod. The rods are especially difficult to remove after repeated compressive loading of the mats (e.g., due to heavy trucks and machinery) of the mats may have compressed the wood.

Some embodiments describe an apparatus for removing rods from wood mats, the apparatus configured to assume an open position and a closed position. The apparatus has a generally cylindrical machine body, having a lateral side, a front end, a rear end, and a longitudinal axis between the front end and the rear end, an attachment at the rear end of the machine body configured to attach a hydraulic cylinder to the machine body. A rod is slidably positioned within the machine body, the rod having a rod depression at a front end of the rod and connected to a rod extender at the front end of the rod, a spring is within the machine body, the spring configured to be compressed by the rod. One or more levers rotatably attached to the lateral side of the machine body, each lever having a locking lever extension arranged to penetrate a hole on the lateral side of the machine body and to fit within the rod depression on the rod therethrough. A plurality of jaws are protruding from a front end of the machine body, each jaw of the plurality of jaws having a curved shape and a pointed end, each jaw rotatably mounted to a jaw mount affixed to the rod extender and movable with respect to the axis. A jaw ring positioned within the front end of the machine body and configured to slidably contact the jaws, wherein when the spring is compressed and the levers are deactivated, the apparatus assumes the closed position whereby the machine body slides with respect to the rod to compress the spring and to align the rod depression with the locking lever extensions, and retracts the plurality of jaws to slide and pivot around the jaw ring to bring the pointed ends of the jaws together radially.

In some aspects, the levers are activated to place the apparatus in the open position by removing the locking lever extensions from the rod depression, releasing the spring to decompress and slide the rod and the rod extension towards the front of the machine body, thereby allowing the jaws to spread apart from each other in a radial direction. The apparatus is configured to be mounted onto a table that can displace the apparatus along three degrees of freedom. The apparatus is made of metal. The jaw mount has a central hub affixed to the rod extension, and each of the plurality of jaws is rotatably affixed to the jaw mount such that the pointed ends of the jaws are directed radially inward and the pointed ends of the jaws can rotate to move towards and away from the axis. The rod extender comprises a rod head support at a front end of the rod extender, the rod extender configured to extend beyond the front end of the machine body when the apparatus is in the open position. The rod head support has a generally circular depression on a front face thereof. The jaw ring is annular and attached to the machine body so as to be concentric within the machine body and flush with the front end of the machine body, the jaw ring having a variable thickness. The jaw ring has first thickness at the front end that increases in a gradual manner to a maximum thickness near the rear of the jaw ring, and then decreases. The jaw ring has a cross sectional profile that is first flat, then has a slope that increases to a maximum height, and then decreases in a curved manner. The variable thickness of the jaw ring includes a curved rear portion that rests against a rear portion of the jaws when the apparatus is in the open position, and a front portion that rests against a middle portion of the jaws when the apparatus is in the closed position, and the variable thickness causes the jaws to rotate as the apparatus moves between the open and closed positions. The pointed end of the jaws are knives that are configured to embed into wood of the wood mats.

A system for removing rods from wood mats, the system includes an apparatus as described above, as well as a hydraulic cylinder attached to the apparatus, a support table that supports the apparatus and is configured to displace the apparatus along three degrees of freedom, and an enclosing housing attached to the support table, the housing sized such that when the apparatus is retracted into the housing, the levers on the apparatus contact the housing and are activated to place the apparatus into the open position. In some aspects, the apparatus is arranged to be moved by the support table into and out of the enclosing housing in a direction of the axis.

A method of removing metal rods from a wooden mat, includes positioning the apparatus of claim 1 near a head of the metal rod, aligning the head of the metal rod with a rod head support at a front end of the rod extender, the rod extender configured to extend beyond the front end of the machine body when the apparatus is in the open position, deactivating the levers and compressing the spring to place the apparatus is the closed position wherein the jaws partially embed into the wooden mat and surround the head of the metal rod. Retracting the apparatus along its axis, thereby removing the metal rod from the wooden mat, and activating the levers to eject the rod from the apparatus.

Advantages of the apparatus and methods described herein include quick extraction of metal rods from embedded wood using a rod puller. The extraction of the metal rods is performed in an automated manner. Little physical force is needed, as a manual worker need not pull or use hand-held tools to remove the rods, as has been done traditionally. Instead, the rod puller system extracts the rods with input from a user to control the rod puller system. Advantageously, the rod puller system can extract a rod from multiple planks at the same. The rod puller is repeatable and automatically returns to the ready position; a user simply need reposition the rod puller with respect to the next rod or rod head, and repeat the extraction.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Figure 1:
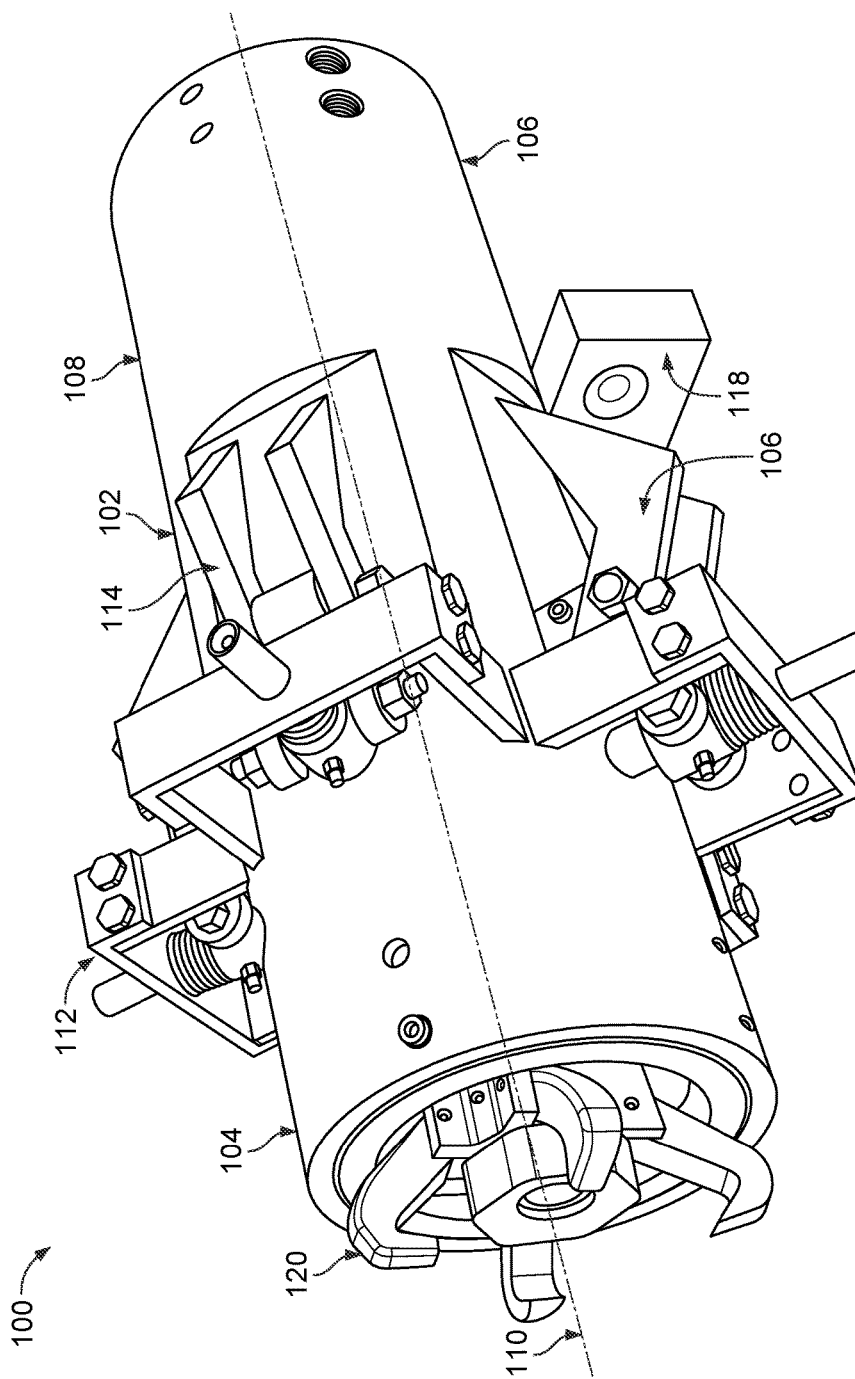
FIG. 1 is a perspective drawing of a rod puller device.

FIG. 1 shows a rod puller 100, a device used for removing metal bolts or rods from wood. The rod puller 100 is generally cylindrical in shape, having a machine body 102 that extends from a front end 104 to a rear end 106. The machine body 102 extends parallel to a central longitudinal axis 110 and includes a lateral side 108 to which one or more levers 114 are fixed. Four levers 114 are shown evenly arranged around the machine body (e.g., at 90 degrees from each other) however fewer (e.g., two) levers or a greater number of levers is possible. An attachment device 112 mounts part of each lever 114 to the lateral body 108. In some instances, the attachment devices 112 can be used to mount the rod puller 100 to other devices (such as to a support table 210 shown in FIG. 4). Alternatively, a body-support connector 118 can attach the machine body 102 to the support table 210, as is known in the art (for example, the body-support connector can include bolts for bolting the machine body 102 to the support table 210, clamps for clamping it, etc.). The machine body 102 is described as cylindrical, but it can be other shapes as well (e.g., square or rectangular in cross section). To support the high forces required for extracting long metal rods from wood, the various components of the rod puller 100 are preferentially made of metal (e.g. stainless steel).

Figure 2:
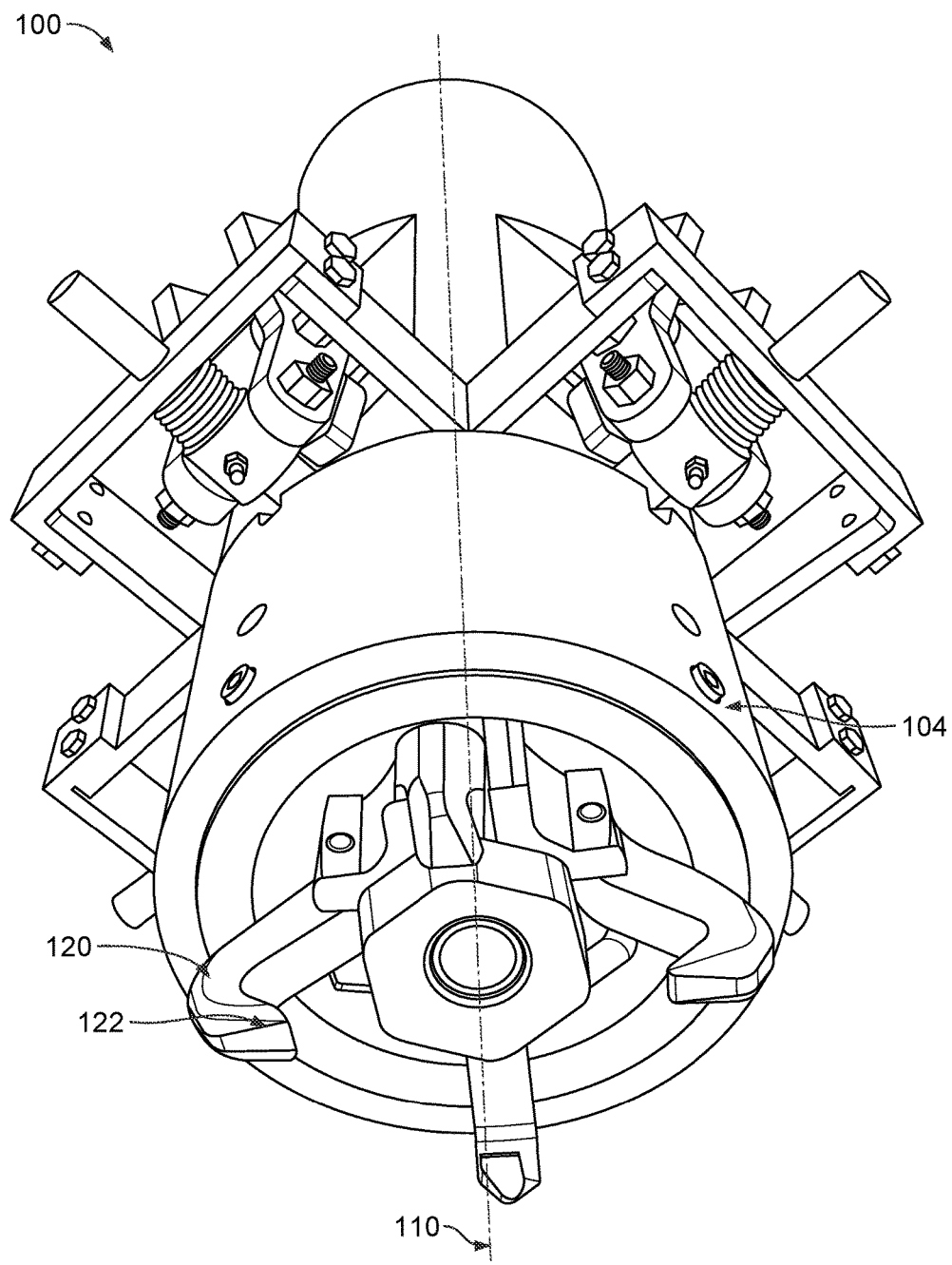
FIG. 2 is a front elevation drawing of the rod puller device of FIG. 1.
Figure 3:
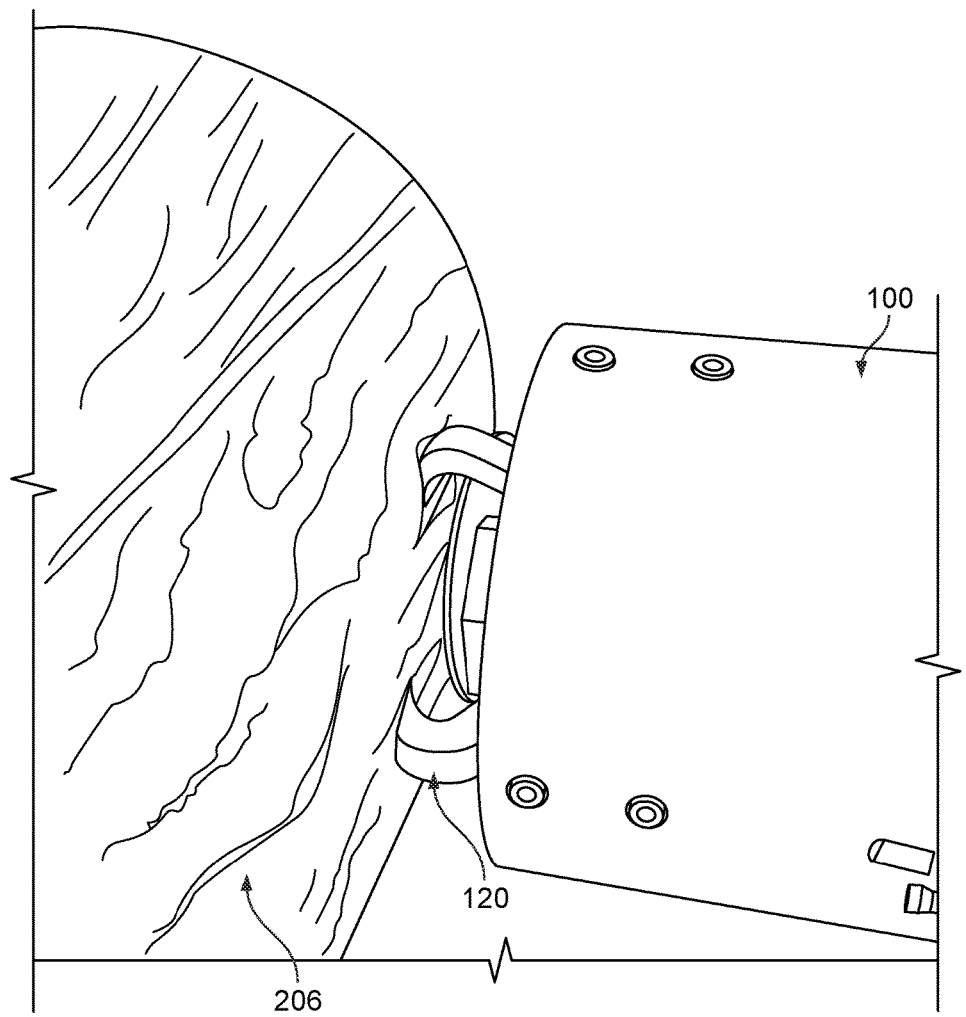
FIG. 3 is a close-up view of the rod puller of FIG. 1 embedded in a wood mat.

Referring as well to FIGS. 2 and 3, the rod puller 100 has a plurality of jaws 120 protruding from the front end 104 of the machine body 102. Each jaw 120 has a generally curved shape that terminates in a pointed end 122 shaped to pierce and dig into wood.

Figure 4:
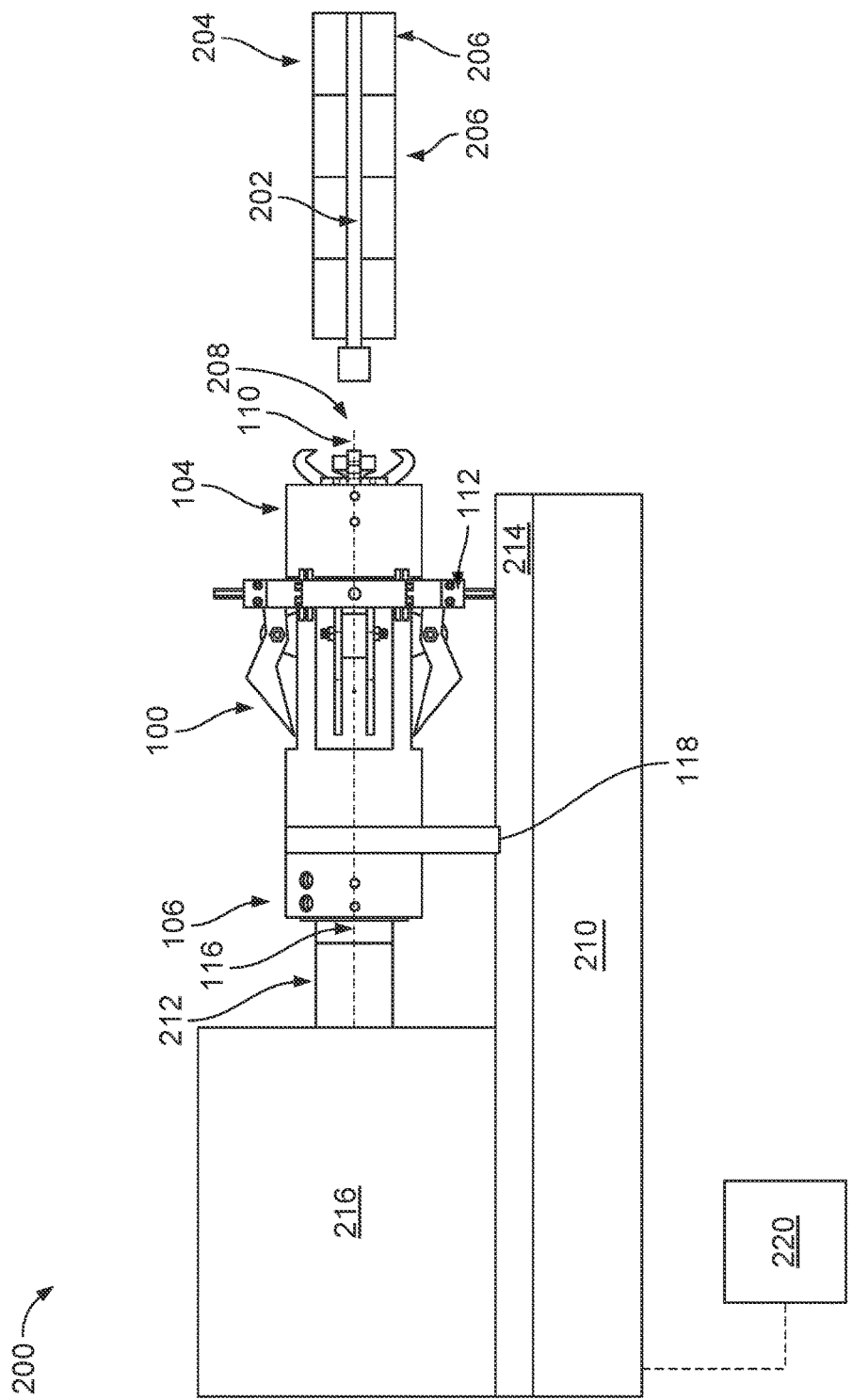
FIG. 4 is a system view showing the device of FIG. 1 as part of a rod puller system.

FIG. 4 shows the rod puller 100 as part of rod pulling system 200 for pulling bolt rods 202 from a wooden mat 204. The bolt rods 202 have previously been driven through wood planks 206 to join the planks together into a wood mat 204, and it is now desirable to remove the bolt rods 202 from the assembled wooden mat 204 for moving, reuse, or recycling the parts of the wooden mat 204. To remove the bolt rods 202, the rod puller 100 moves between an open position, and a closed position where it grasps the head of a rod, or rod head 208, partially protruding from or fully embedded within a wood mat 204. The rod puller 100 removes the bolt rod 202, and then releases the rod while returning to the open position to become ready to remove another bolt rod 202.

The rod puller 100 is generally mounted on a support table 210. The support table attaches to the rod puller at the body support connector 118. The support table 210 can move and position the rod puller 100 in three axis (e.g., x, y, z) so that the front end 104 of the rod puller 100 is aligned with the bolt rod 202 to be pulled. In particular, the front end 104 of the rod puller is moved by the support table to align with the rod head 208. The support table includes a rod puller moving mechanism 214. The rod puller moving mechanism 214 acts to displace the rod puller 100 relative to the support table 210. The rod puller moving mechanism 214 acts to displace the rod puller 100 longitudinally, e.g., along its axis 110. In some instances, the rod puller moving mechanism 214 can provide one of the three degrees of freedom of motion supplied by the support table 210. The rod puller moving mechanism 214 can include rails or a track with an attached motor that moves the rod puller with respect to the support table 210. Such displacement devices are known in the art.

The rear end 106 of the rod puller 100 includes a hydraulic cylinder attachment 116 that attaches the machine body 102 of the rod puller 100 to a hydraulic system 212 that exerts force on the rod puller 100. The hydraulic system 212 is configured to apply sufficiently high forces to the machine body 102 of the rod puller via the hydraulic cylinder attachment 116 so that the jaws 120 of the rod puller 100 are driven into the solid wood of the wood mats 204.

A housing 216 is installed as part of the rod puller system 200 near the rear end 106 of the rod puller 100. The housing 216 is attached to the support table 210, and is displaced with the movement of the support table 210. In some instances, the housing 216 is fixedly mounted to the support table 210, or is part of the support table 210. The housing 216 is sized and shaped to be generally hollow so that the rod puller 100 can be at least partially enclosed within the housing 216. In particular, the housing 216 can be sized and shaped such that when the rod puller 100 is retracted into the housing 216 via the rod puller moving mechanism 214, the levers 114 attached to the machine body 102 contact the housing 216. Contacting the housing 216 includes applying a compressive or inward force on the levers 114, or activating the levers 114. This activation of the levers triggers the transition of the rod puller 100 from its closed to its open position.

A controller 220 can coordinate and control the various components of the rod puller system 200, including the movement of the support table 210, the movement of the rod puller moving mechanism, and the force applied hydraulic system 212. The controller can include a user-interface that can allow a user to control various speeds of the moving components. In some instances, the controller 220 can include an "open" and "close" command, for ease of using in controlling the rod puller system 200 as it extracts bolt rods 202.

Figure 5A:
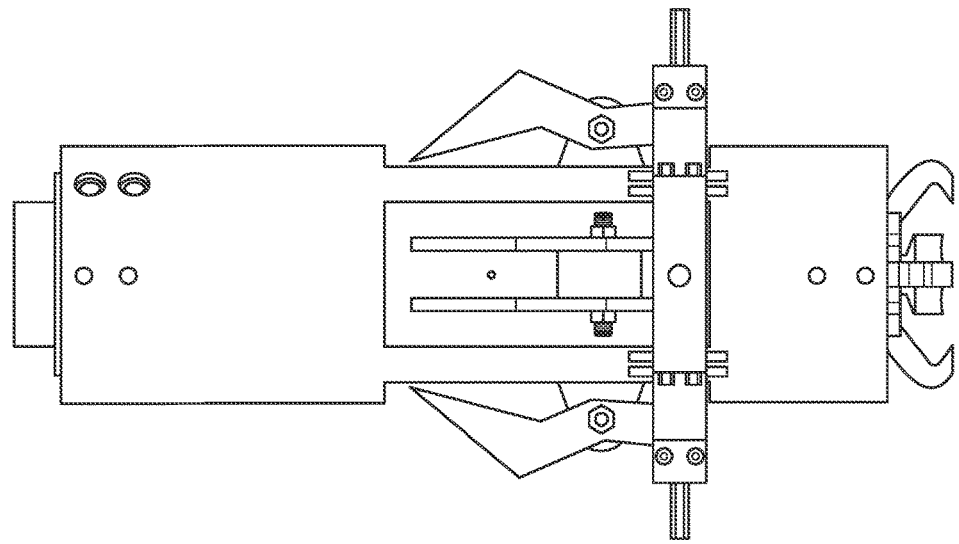
FIGS. 5A and B are side views of the rod puller of FIG. 1 in open and closed positions, respectively.
Figure 5B:
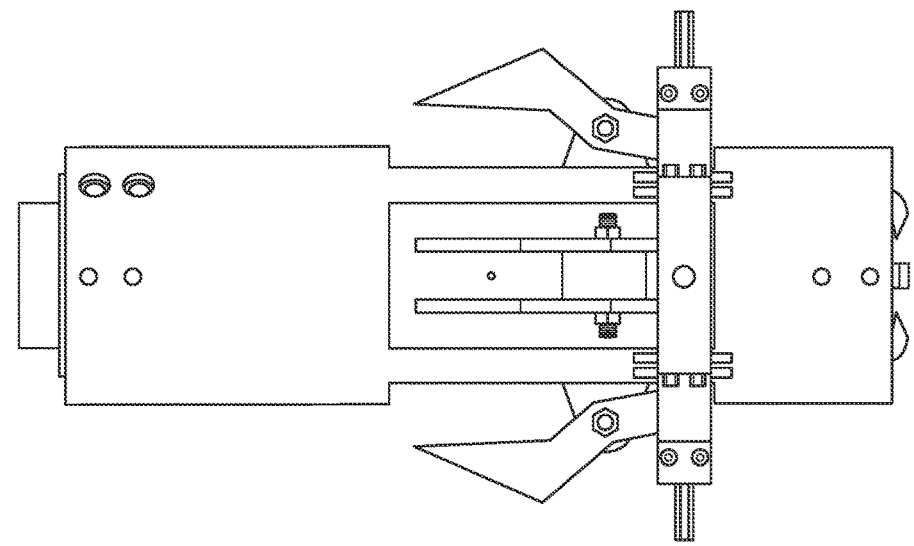

FIGS. 5A and B show the outside of the rod puller 100 in the open and closed positions, respectively.

Figure 6A:
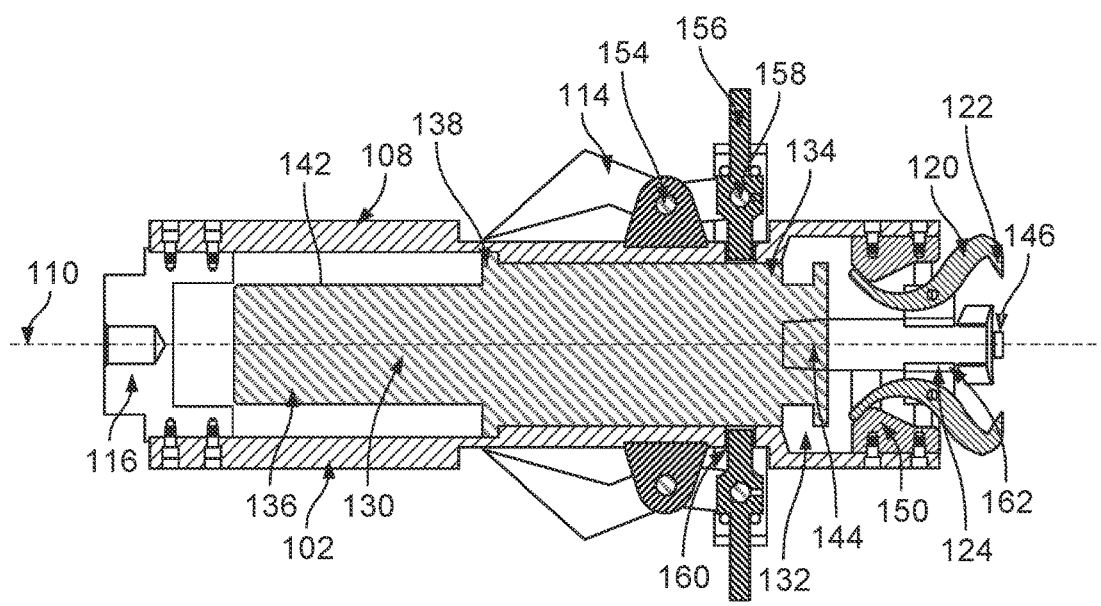
FIGS. 6A and B are cross sectional views of the rod puller of FIG. 1 in the open position.
Figure 6B:
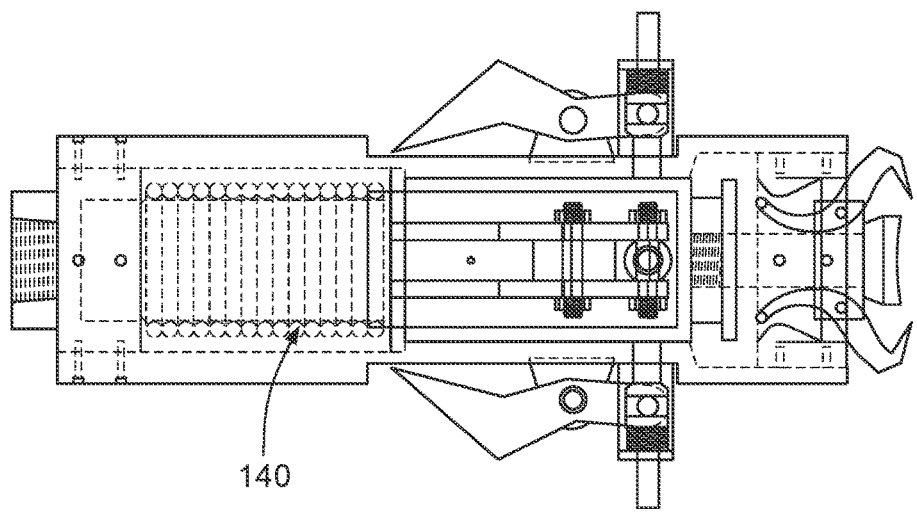

FIGS. 6A and B show cross sectional views of the rod puller 100 in the open position. Within the machine body 102 is a rod 130 that is slidably positioned within the machine body 102. The rod 130 is generally cylindrical with some variations in cross section. In particular, the rod 130 has a series of divots or a depression 132 at a front end 134 of the rod 130. The rod 130 has a diminished cross section at a rear end 136 of the rod, so that a ledge 138 is formed near the rear end 136 of the rod. As can be seen in FIG. 6B, a spring 140 fits around this diminished cross section at the rear end 136 of the rod, fitting within a spring space 142 formed between the inside surface of the machine body 102 and the outer surface of the rod 130. The spring 140 is compressed by the ledge 138 of the rod 130.

A rod extender 144 is attached to the front of the rod 130 and extends forward. The rod extender 144 is generally cylindrical in shape and at its most frontal part has a rod head support 146. The rod head support 146 has a generally circular depression on a front face thereof. The rod extender 144 and rod are configured so that the rod extender 144 extends beyond the front end 104 of the machine body when the rod puller 100 is in the open position, so that the rod head support 146 extends past the front face of the machine body 102. The rod head support 146 provides a surface that mates with the rod head 208 of a metal bolt rod 202. In some instances, the rod 130 and rod extender 144 can be separate pieces that are joined together. Alternatively, the rod 130 and rod extender 144 can be an integral unit. At the front end 104 of the machine body 102, each jaw 120 is pivotably or rotatably mounted to a jaw mount 124 which is affixed to the rod extender 144. Connected to an inside surface of the machine body 102 at the front end 104, a jaw ring 150 within the machine body 102. The jaw ring 150 is positioned and configured to slidably contact the jaws 120 on their back surfaces.

Figure 7A:
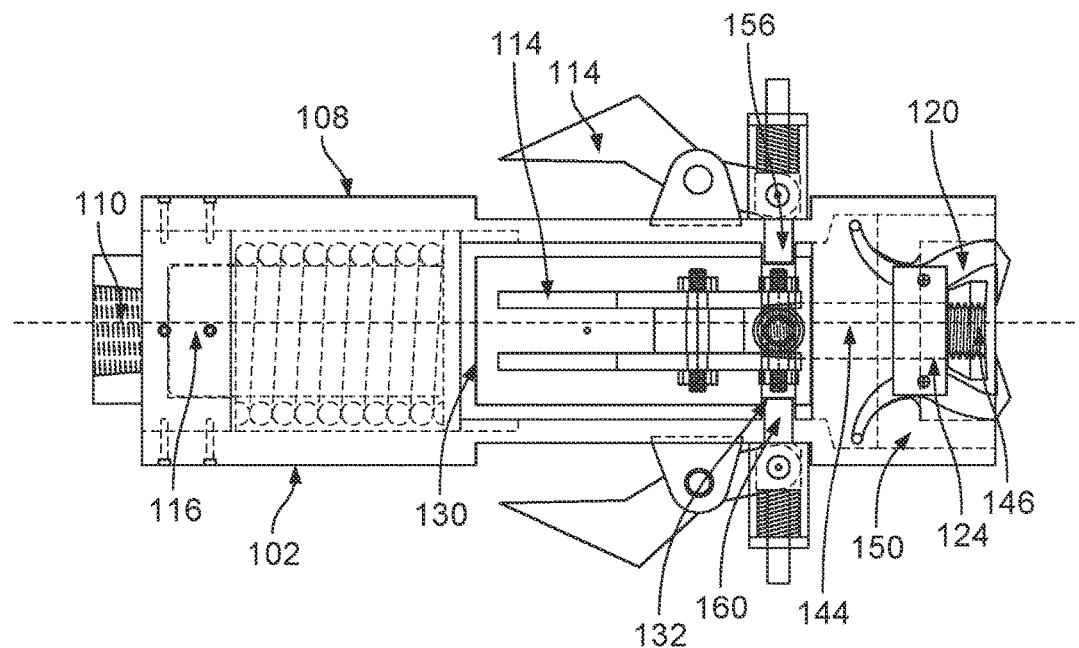
FIGS. 7A and B are cross sectional views of the rod puller of FIG. 1 in the closed position.
Figure 7B:
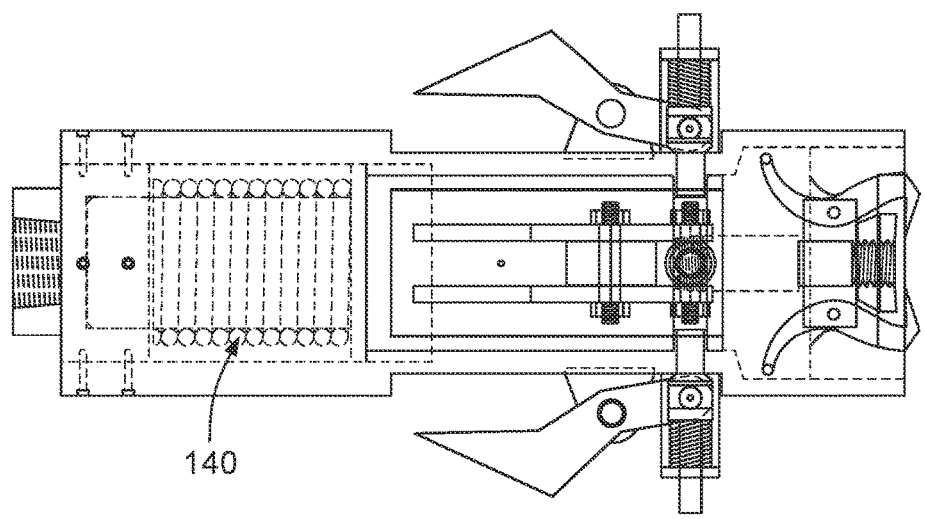

The levers 114 are attached to the lateral side 108 of the machine body 102 so that each lever 114 can pivot around a lever pivot point 154 with respect to the lateral side 108. Each lever 114 connects to a locking lever extension 156 that is rotatably fixed to the respective lever 114 at an extension pivot point 148. Rotation of the levers 114 (e.g., rotation caused by activation of the levers 144 due to contact with the housing 216) thus results in a radial movement of the locking lever extension towards or away from the central axis 110. Each locking lever extension 156 is arranged to penetrate a slot or hole 160 on the lateral side 108 of the machine body 102. The hole 160 allows access from the outside of the lateral side 108 to within the machine body 102. The locking lever fits within these holes 160. Further, a butt end of the locking lever extension 156 can fit within the depression 132 on the rod 130, a spatial relationship which occurs when the rod puller 100 is in the closed position (as shown in FIGS. 7A and B).

Referring in particular to FIG. 6A, the jaw mount 124 has a central hub 162 affixed to the rod extension 156 rear of the rod head support 146. Each of the jaws 120 is rotatably affixed to the jaw mount 124 at a middle region of each jaw 120. The jaws 120 are mounted to the central hub 162 such that the pointed ends 122 are generally directed radially inward (e.g., towards the axis 110) and such that the jaws 120 can pivot with respect to the central hub 162. The pointed ends 122 can rotate to move towards and away from the axis 110. The jaws 120 have a general "S" shape, with the pointed ends 122 at one end, and a curved back end opposite the pointed jaws 122. The jaws 120 are mounted to the central hub 162 near a central portion of the jaws 120.

The jaw ring 150 is attached to the inside surface of the machine body 102 near the jaws 120. The jaw ring 150 can be annular, e.g., fits as a single collar within the machine body 102. In some implementations, the jaw ring 150 is made up of separate pieces attached to the inside surface of the machine body 102 near each respective jaw 120. The jaw ring is generally concentric with the axis 110 within the machine body 102 and flush with the edge of the machine body 102. As can be seen in FIGS. 6A and 7A, the jaw ring 150 has a shaped cross section, or thickness that is variable along the length of the jaw ring 150 (moving from the front part to the back part of the jaw ring 150). The front of the jaw ring, (e.g., the portion near the front edge of the machine body 102 when the jaw ring 150 is assembled to the machine body 102) has a first width or thickness that is relatively thin. This thin front width of the jaw ring 150 increases along the length of the jaw ring 150 to reach a maximum thickness near the rear of the jaw ring 150 before once again decreasing or sloping back down. The increase in thickness can be gradual and smooth, or the thickness can increase quickly as in a step-wise manner. The jaw ring 150 thus has a cross sectional profile that is first flat, then has a slope that increases to a maximum height, and then decreases in a curved manner towards the rear of the jaw ring 150.

The shape of the jaw ring 150 with its variable thickness performs a closing function when brought into contact with the shaped jaws 120. The curved rear portion of the jaw ring 150 rests against the rear curved portion of the jaws 120 when the apparatus is in the open position (e.g., in FIG. 6A). The thin front portion of the jaws 150 rests against the middle, curved portion of the jaws 120 when the rod puller 100 is in the closed position (e.g., in FIG. 7A). When the jaws 120 are displaced relative to the jaw mount 150 (e.g., slid backwards by the central hub 162 of the jaw mount 124 relative to the jaw ring 150), the variable cross section of the jaw ring 150 causes the jaws 120 to rotate as the apparatus moves between the open and closed positions. This rotation causes the pointed ends 122 of the jaws to dig into the wood mat 204 as the rod puller 100 moves to the closed position, or to release a removed bolt rod 202 grasped between the jaws 120 while returning to the open position.

To remove bolt rods 202 from a wood mat 204, a user positions the rod puller 100 and a support table 210 near a rod head 208 of a metal bolt rod 202. Using the rod puller moving mechanism 214, the user aligns the rod head 208 with the rod head support 146 protruding from the front end of the rod extender 144, e.g., with the rod puller 100 in the open position shown in FIGS. 5A, 6A, and 6B. In the open position, the rod extender 144 extends beyond the front end 104 of the machine body 102 so that the jaws 120 can fit around a rod head 208. The user positions the machine body 102 (in three dimensions) via the support table 210 and rod puller moving mechanism 214 so that the pointed ends 122 encircle the rod head 208.

The hydraulic cylinder attachment 116 is attached to the machine body 102 at the rear end 106 of the rod puller 100, while the body support connector 118 fixes the machine body 102 to the rod puller moving mechanism 214 of the support table 210. Once the rod head support 146 is positioned in proximity to the bolt rod 202, the hydraulic system is activated to move the machine body 102 via the hydraulic cylinder attachment 116 with respect to the rod 130. The machine body 102 slides with respect to the rod 130. The ledge 138 at the rear of the rod 130 thus compresses the spring 140 as the machine body 102 slides with respect to the rod 130 and spring space 142 reduces in size. The relative displacement of the machine body 102 with respect to the rod 130 continues until the rod depression 132 aligns with the holes 160 and thus with the locking lever extensions 156 which are within the holes 160. The locking lever extensions 156 can now slide into place over the holes 160 in the rod 130.

As the machine body 102 is moved forward with respect to the rod 130 and the rod extender 144, the jaw ring 150 slides along the back surface of the curved jaws 120. The curvature and shape of the jaw ring 150 rotate the jaws 120 towards the axis 110, and the pointed ends 122 of the jaws pierce and bite into the wood mat 204 surrounding the bolt rod 202. As the machine body 102 continues to move, the jaws 120 embed themselves in the wood mat 204, surrounding and clutching the rod head 208. When the locking lever extensions 156 have slid further through the holes 160 and into the rod depression 132, the rod puller 100 has moved into the closed position.

In the closed position, the rod puller moving mechanism 214 and the hydraulic system 212 work as a unit to retract the rod puller from the wood mat 204. The bolt rod 202 is pulled from the wood mat 204 via the jaws 120 due to this action. Referring again to FIG. 4, the rod puller 100 with extracted bolt rod 202 is retracted until the levers 114 contact the housing 216. The walls of the housing 216 press against the levers 114 to activate them by pressing them downward. Due to the lever pivot point 154 and the extension pivot point 158, this activation of the levers 114 causes the locking lever extensions 156 to move outwards from the depression 132. Without the retaining force of the locking lever extensions 156, the compressed spring 140 pushing against the ledge 138 of the rod 130 is freed to release its stored energy. The spring 140 explosively pushes against the ledge 138 of the rod 130, pushing the rod 130 forwards. As this motion occurs, the rod extender 144 moves the jaws 120 against the jaw ring 150 in the forward direction. The movement of the jaws 120 against the jaw ring 150 in the forward direction has the reverse effect as in the rear direction and the jaws 120 move radially outwards. This motion releases the extracted bolt rod 202. The rod puller 100 is once again in the open position, and ready to extract the next bolt rod 202.

To extract a bolt, the rod puller 100 compresses the spring 140 to place the apparatus in the closed position. The compression occurs while the levers are deactivated, e.g., not pushed downwards such as by the housing 216. To assume the closed position, the machine body 102 slides with respect to the rod 130 to compress the spring 140 and to align the rod depression 132 with the locking lever extensions 152. Simultaneously, the jaws 120 slide and pivot around the jaw ring 150 to bring the pointed ends 122 of the jaws together radially. The jaws 120 are then partially embedded into the wooden mat 120, surrounding the bolt head 208. The rod puller 100 is retracted along its axis 110, thereby removing the bolt rod 202 from the wooden mat 204. The retraction of the rod puller 100 causes the levers 114 to be activated, and eject the rod from the apparatus. The levers 114 are activated to place the rod puller 100 back in the open position by removing the locking lever extensions 156 from the rod depression 132, which releases the spring 140, allowing it to decompress and slide the rod 130 and the rod extender 144 towards the front of the machine body A number of embodiments have been described. Nevertheless, it will be understood that various modifications may be made without departing from the spirit and scope of the invention. For example, although the rod puller has been described with respect to removing metal rods from assembled timber mats, removal of other types of rods from different substrates or embedded materials are possible. Accordingly, other embodiments are within the scope of the following claims.

What is claimed is:

1. An apparatus for removing rods from wood mats, the apparatus configured to assume an open position and a closed position, the apparatus comprising:
    a generally cylindrical machine body, having a lateral side, a front end, a rear end, and a longitudinal axis between the front end and the rear end;
    an attachment at the rear end of the machine body configured to attach a hydraulic cylinder to the machine body;
    a rod that is slidably positioned within the machine body, the rod having a rod depression at a front end of the rod and connected to a rod extender at the front end of the rod;
    a spring within the machine body, the spring configured to be compressed by the rod;
    one or more levers rotatably attached to the lateral side of the machine body, each lever having a locking lever extension arranged to penetrate a hole on the lateral side of the machine body and to fit within the rod depression on the rod therethrough;
    a plurality of jaws protruding from a front end of the machine body, each jaw of the plurality of jaws having a curved shape and a pointed end, each jaw rotatably mounted to a jaw mount affixed to the rod extender and movable with respect to the axis; and
    a jaw ring positioned within the front end of the machine body and configured to slidably contact the jaws,
    wherein when the spring is compressed and the levers are deactivated, the apparatus assumes the closed position whereby the machine body slides with respect to the rod to compress the spring and to align the rod depression with the locking lever extensions, and retracts the plurality of jaws to slide and pivot around the jaw ring to bring the pointed ends of the jaws together radially.

2. The apparatus of claim 1, wherein the levers are activated to place the apparatus in the open position by removing the locking lever extensions from the rod depression, releasing the spring to decompress and slide the rod and the rod extension towards the front of the machine body, thereby allowing the jaws to spread apart from each other in a radial direction.

3. The apparatus of claim 1, wherein the apparatus is configured to be mounted onto a table that can displace the apparatus along three degrees of freedom.

4. The apparatus of claim 1, wherein the apparatus is made of metal.

5. The apparatus of claim 1, wherein the jaw mount has a central hub affixed to the rod extension, and each of the plurality of jaws is rotatably affixed to the jaw mount such that the pointed ends of the jaws are directed radially inward and the pointed ends of the jaws can rotate to move towards and away from the axis.

6. The apparatus of claim 1, wherein the rod extender comprises a rod head support at a front end of the rod extender, the rod extender configured to extend beyond the front end of the machine body when the apparatus is in the open position.

7. The apparatus of claim 6, wherein the rod head support has a generally circular depression on a front face thereof.

8. The apparatus of claim 1, wherein the jaw ring is annular and attached to the machine body so as to be concentric within the machine body and flush with the front end of the machine body, the jaw ring having a variable thickness.

9. The apparatus of claim 8, wherein the jaw ring has first thickness at the front end that increases in a gradual manner to a maximum thickness near the rear of the jaw ring, and then decreases.

10. The apparatus of claim 8, wherein the jaw ring has a cross sectional profile that is first flat, then has a slope that increases to a maximum height, and then decreases in a curved manner.

11. The apparatus of claim 8, wherein the variable thickness of the jaw ring includes a curved rear portion that rests against a rear portion of the jaws when the apparatus is in the open position, and a front portion that rests against a middle portion of the jaws when the apparatus is in the closed position, and the variable thickness causes the jaws to rotate as the apparatus moves between the open and closed positions.

12. The apparatus of claim 1, wherein the pointed end of the jaws are knives that are configured to embed into wood of the wood mats.

13. A system for removing rods from wood mats, the system comprising:
   the apparatus of claim 1;
   a hydraulic cylinder attached to the apparatus;
   a support table that supports the apparatus and is configured to displace the apparatus along three degrees of freedom; and
   an enclosing housing attached to the support table, the housing sized such that when the apparatus is retracted into the housing, the levers on the apparatus contact the housing and are activated to place the apparatus into the open position.

14. The system of claim 13, wherein the apparatus is arranged to be moved by the support table into and out of the enclosing housing in a direction of the axis.

15. A method of removing metal rods from a wooden mat, the method comprising:
   positioning the apparatus of claim 1 near a head of the metal rod;
   aligning the head of the metal rod with a rod head support at a front end of the rod extender, the rod extender configured to extend beyond the front end of the machine body when the apparatus is in the open position;
   deactivating the levers and compressing the spring to place the apparatus is the closed position wherein the jaws partially embed into the wooden mat and surround the head of the metal rod;
   retracting the apparatus along its axis, thereby removing the metal rod from the wooden mat; and
   activating the levers to eject the rod from the apparatus.

* * * * *